F. HNILO AND J. SCHULTZ.
BATH CABINET SUPPORTING FRAME.
APPLICATION FILED MAR. 17, 1922.
1,425,772.
Patented Aug. 15, 1922.
2 SHEETS—SHEET 2.
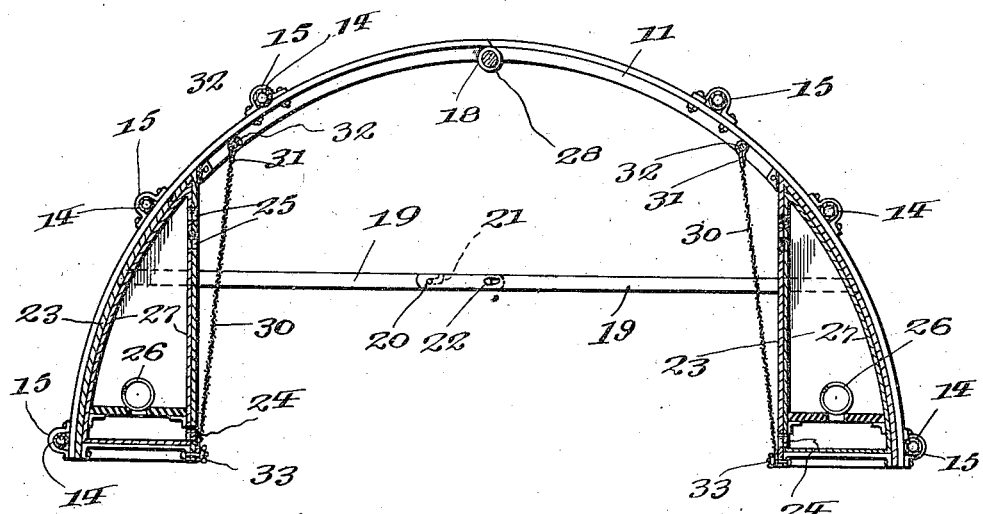
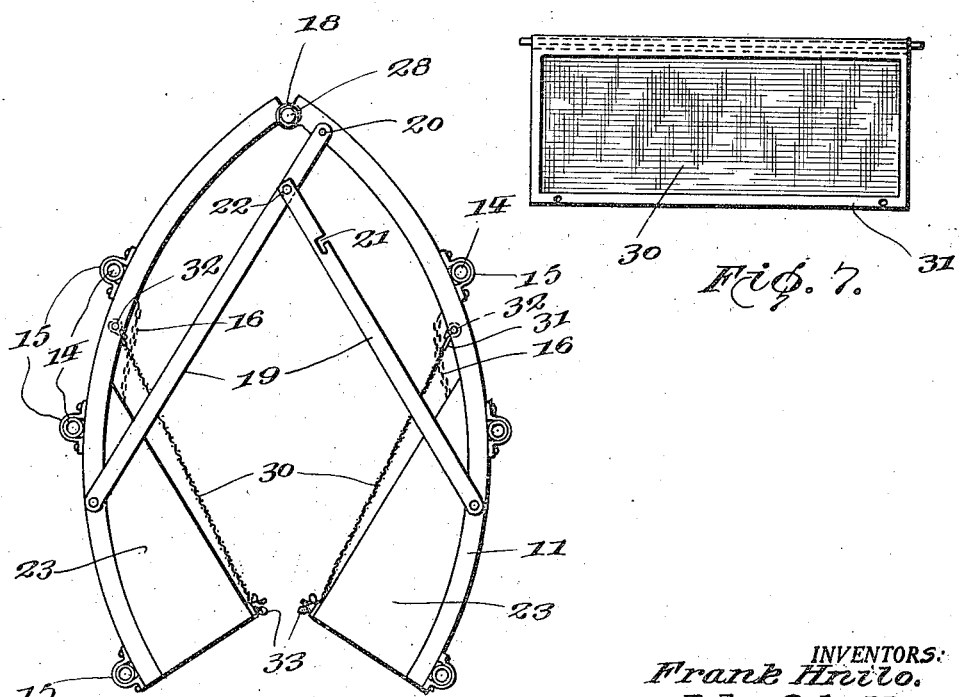
INVENTORS:
Frank Hnilo.
John Schultz.
BY
ATTORNEYS.

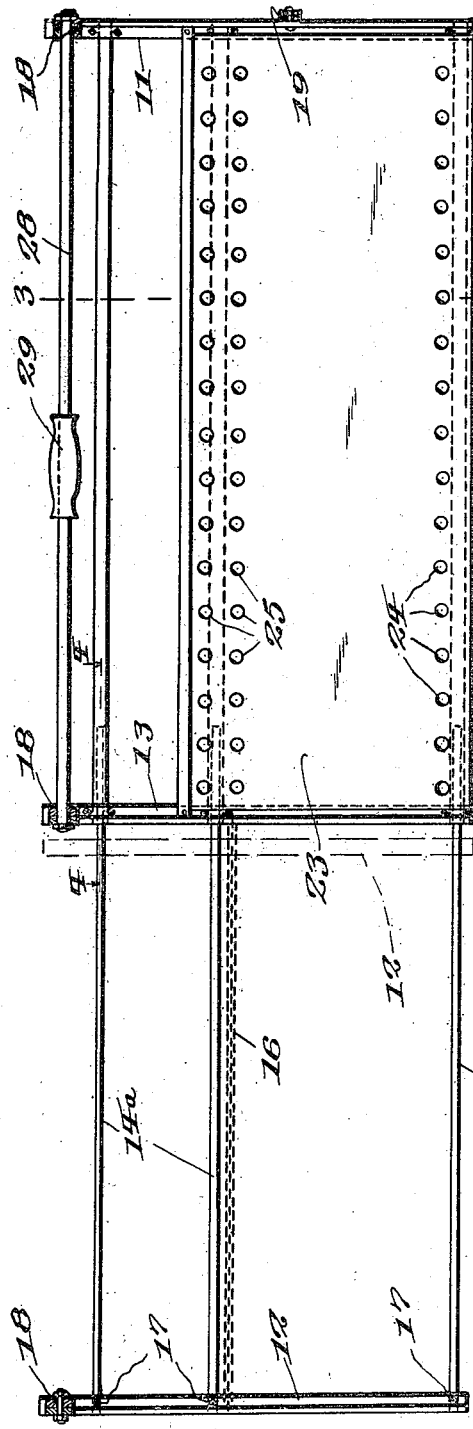

UNITED STATES PATENT OFFICE.

FRANK HNILO AND JOHN SCHULTZ, OF CICERO, ILLINOIS.

BATH-CABINET-SUPPORTING FRAME.

1,425,772.  Specification of Letters Patent.  Patented Aug. 15, 1922.

Application filed March 17, 1922. Serial No. 544,618.

*To all whom it may concern:*

Be it known that we, FRANK HNILO and JOHN SCHULTZ, citizens of the United States, residing at Cicero, in the county of Cook and State of Illinois, have invented new and useful Improvements in Bath-Cabinet-Supporting Frames, of which the following is a specification.

This invention relates to apparatus for applying hot air or vapor to the human body for the treatment of certain ailments, and more particularly to apparatus of this kind consisting of an enclosure for the body and a means for heating the air within the enclosure.

The invention has for its object to provide an enclosure which is supported by a frame of novel and improved construction which permits the folding of such frame into small and compact form for convenience in storage, and also transportation from one place to another.

The object stated is attained by means of a combination and arrangement of parts to be hereinafter described and claimed, and in order that the same may be better understood, reference is had to the accompanying drawings, wherein:

Figure 1 is a perspective view of the apparatus; Fig. 2 is a central longitudinal section of the frame, drawn to an enlarged scale; Fig. 3 is a cross-section of the frame on the line 3—3 of Fig. 2; Fig. 4 is a section on the line 4—4 of Fig. 2; Fig. 5 is an enlarged sectional detail showing the means for securing one of the frame bars; Fig. 6 is an end view showing the frame folded, and Fig. 7 is an elevation of a screen.

Referring specifically to the drawings, the enclosure for the body is substantially semicircular or arched in cross-section, and it is composed of a skeleton frame and a covering 10 of suitable material which is air-tight, or substantially so. The frame consists of a pair of arched end bars 11 and 12, and an intermediate arched bar 13, these bars being connected so that they may be folded.

The connection between the end bar 11 and the intermediate bar 13 of the frame is made by longitudinal bars 14 rigidly secured thereto by clips 15. The bars 14 are located at the bottom and the sides of the arched bars 11 and 13, and they are tubular so as to telescopically receive correspondingly located rods 14ª carried by the end bar 12 and extending inwardly therefrom. The end bar 12 can therefore be moved over close to the intermediate bar 13 to materially reduce the length of the frame when the same is not in use, as shown dotted in Fig. 2. The movement of the end bar 12 away from the intermediate bar 13 is limited by chains 16 connecting said bars. The rods 14 are rigidly secured to the bar 12 by bolts 17. The three arched bars 11, 12 and 13 are angular in cross-section for greater strength and rigidity.

The frame hereinbefore described is further made foldable by making the arched bars 11, 12 and 13 each in two sections which are hingedly connected, the hinges 18 being midway between their ends or at the top of the arch. Thus, the arched bars can be folded transversely of the frame as shown in Fig. 6 to materially reduce the width thereof, and this folding, together with the hereinbefore described construction which permits the frame to be shortened, enables the frame to be reduced to a very small and compact form for convenience in storage, and transfer from one place to another.

The two sections of the end bar 11 are connected by stretcher links 19 which are pivotally connected so that they spread and come into alinement when the sections are unfolded, thereby holding the same against accidental collapse. The inner end of one of the links carries a side pin 20 which enters an angular notch 21 in the edge of the other link when the two links are in alinement, and thus serves to lock them in this position. The pivotal connection 22 between the links is a sufficiently loose one to enable the pin 20 to enter and leave the notch 21.

The means for heating the interior of the enclosure consist of two heating chambers, one of such being on one side, and the other on the opposite side, and both being inside the enclosure.

Each heating chamber consists of a metal casing 23 extending lengthwise between the arched bars 11 and 13, and secured to said bars in any suitable manner. The casing is closed at its ends and at the top, and in the side wall which faces the interior of the enclosure are air inlet apertures 24, and air outlet apertures 25, the former being near the bottom and the latter near the top of the casing.

In each casing 23 is mounted an electric heating element 26, and as this is disclosed in another application it need not be described in the present application. Each casing has an inner lining 27 of asbestos paper.

In order to facilitate transportation of the apparatus, the bars 11 and 13 are connected at the top by a handle rod 28 provided intermediate its ends with a hand grip 29.

In front of the side wall of each heater casing 23 which faces the interior of the enclosure is mounted a guard to prevent the patient from coming in contact with said wall. This guard or shield is a wire netting 30 secured in a frame 31 which is pivotally hung at the top, as shown at 32, to the arched bars 11 and 13, and detachably secured at the bottom to the casing wall by wing nuts or other suitable fasteners 33, which latter, when they are operated to release the guard, enable the same to be swung away from the casing wall for cleaning the same, or for other purposes requiring access from the inner side. Fig. 2 of the drawings shows the guard removed.

We claim:

1. A supporting frame for a bath cabinet, comprising arched end and intermediate bars, each of said bars being composed of a pair of hinged sections to permit folding transversely of the frame, a rigid connection between the intermediate bar and one of the end bars, and a slidable connection between said bars and the other end bar.

2. A supporting frame for a bath cabinet, comprising arched end and intermediate bars, tubular longitudinal bars rigidly connecting the intermediate bar and one end of the end bars, and longitudinal rods extending from the other end bar and telescopically seating in the aforesaid longitudinal bars.

3. A supporting frame for a bath cabinet, comprising arched end and intermediate bars, each of said bars being composed of a pair of hinged sections to permit folding transversely of the frame, tubular longitudinal bars rigidly connecting the intermediate bar and one of the end bars, and longitudinal rods extending from the other end bar and telescopically seating in the aforesaid longitudinal bars.

In testimony whereof we affix our signatures.

FRANK HNILO.
JOHN SCHULTZ.